United States Patent [19]

Gradoboev et al.

[11] Patent Number: 4,763,772

[45] Date of Patent: Aug. 16, 1988

[54] APPARATUS FOR EXTRACTION AND FEEDING OF PIECE ARTICLES FROM A BULK

[76] Inventors: Vladimir T. Gradoboev, ulitsa Kropotkina, 120/1, kv. 86; Alexandr M. Klimenov, ulitsa Nevelskogo, 5, kv. 45; Georgy A. Konyshev, ulitsa S. Shamshinykh, 83, kv. 27, all of Novosibirsk, U.S.S.R.

[21] Appl. No.: 899,230

[22] PCT Filed: Dec. 6, 1984

[86] PCT No.: PCT/SU84/00071

§ 371 Date: Jul. 25, 1986

§ 102(e) Date: Jul. 25, 1986

[87] PCT Pub. No.: WO86/03475

PCT Pub. Date: Jun. 19, 1986

[51] Int. Cl.⁴ .................... B65G 47/24; B65G 33/24
[52] U.S. Cl. .................... 198/398; 198/670; 198/676
[58] Field of Search .............. 198/398, 676, 670, 671; 221/157

[56] References Cited

U.S. PATENT DOCUMENTS 2,336,606  12/1943  Everett ........................ 198/390
3,221,857  12/1965  Keller ........................ 198/455 X
3,871,515   3/1975  Randrup ...................... 221/157 X
4,438,840   3/1984  Damen ........................ 198/398
4,699,226  10/1987  Muller et al. ................ 198/676 X

FOREIGN PATENT DOCUMENTS 597608   3/1978  U.S.S.R. .
962137   9/1982  U.S.S.R. .
1006339  3/1983  U.S.S.R. .

Primary Examiner—George A. Suchfield
Assistant Examiner—Matthew Smith
Attorney, Agent, or Firm—Fleit, Jacobson, Cohn & Price

[57] ABSTRACT

The apparatus comprises a device for extraction of piece articles heaped up in a hopper (2), made in the form of a gripping screw (4) and a transporting screw (5), arranged along whereof are members (8 and 9) for holding of articles (7) in the predetermined position during transportation. A body (10) of the gripping screw (4) carries at least one spiral groove (12b), a portion of which is a transporting surface (13a) forming pockets (15) jointly with the members (8 and 9) for holding the articles (7). Arranged at an angle to the gripping screw (4) in the hopper (2) is an orienting plate (14) forming inlets to said pockets (15) and installed with a possibility of changing the configuration of said inlets.

3 Claims, 4 Drawing Sheets

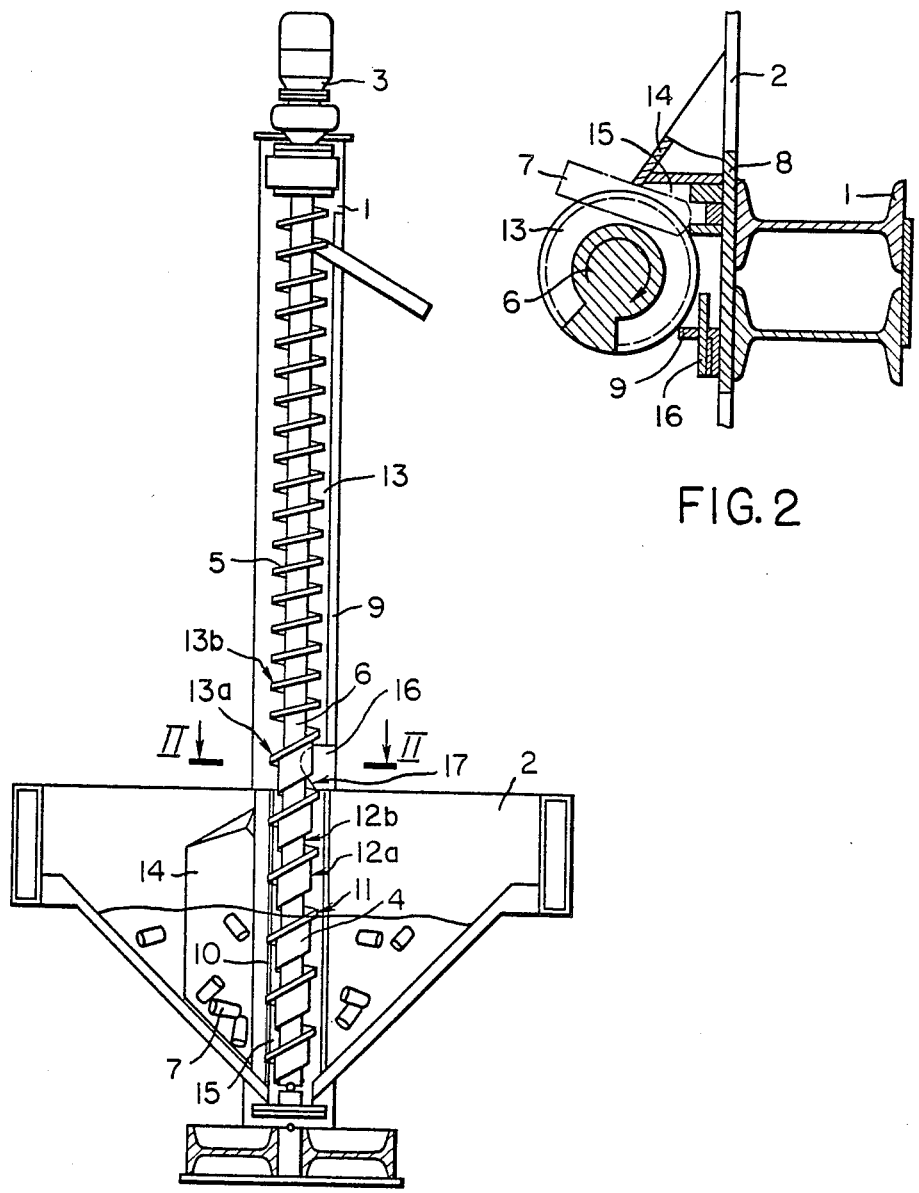

APPARATUS FOR EXTRACTION AND FEEDING OF PIECE ARTICLES FROM A BULK

TECHNICAL FIELD

The invention relates to hoisting-and-conveying equipment, and more specifically, to apparatuses for extraction and feeding of piece articles from a bulk.

BACKGROUND ART

When feeding piece articles from a bulk to the production equipment work site, the need arises to extract the articles piece by piece and, having arranged them in the preset position, transport them to other actuators, which manipulate the articles according to the predetermined program.

Articles with the length-to-diameter ratio (l/d) exceeding 6 are referred to as long articles. Being heaped up in a hopper, such articles form stable bridges in the operating area of the extracting means, which breaks the rhythm of extraction and feeding of articles to the production equipment. Therefore, prior art apparatuses use energetic agitation of all articles contained in the hopper, as by shaking, vibration and scattering, which is conducive to damage of the surface of articles and to excessive noise. Moreover, the dimensions of the hopper in prior art apparatuses are restricted by the conditions under which the extracting means are capable of piece-by-piece separation of articles from a bulk. Also, said prior art apparatuses have a high-positioned hopper, essential for obtaining the requisite difference in heights between the charging and feeding levels, which is a major inconvenience in operation. It is noteworthy that the larger the dimensions of the articles being charged into the hopper, the larger the overall dimensions and working height of the latter, which impedes charging; on the other hand, the necessity for piece-by-piece feeding of articles into the hopper causes additional inconveniences in operation.

Known in the art are elevator-type charging apparatuses with chain conveyers and low-positioned hoppers. A disadvantage of such apparatuses, however, is also the possibility of a bridge being formed in handling long articles, whereas use of agitators causes damage to the surface of articles and generates excessive noise. Such apparatuses allow only simple-shaped articles to be extracted from a bulk and fed therefrom.

Also known in the art is a screw conveyer (USSR Inventor's Certificate No. 597,608, Int. cl. B 65 G 33/24, 1978), comprising a means for extraction of piece articles bulked in a hopper, made in the form of a gripping and a conveying screws, arranged parallel to which are members for holding of articles in the preset position during transportation, made in the form of ratchet teeth provided on the inner surface of the transporting tube, with the teeth projections at the tube inlet, made on the arcs of circumferences, diminishing towards the tube end.

Disadvantages of said apparatus are:

the gripping screw being made in the form of an individual member - the agitator, acting only upon the lower layer of the articles pressed down by the upper ones, imposes great loads upon these articles, thereby causing damage to the surface thereof;

variation of the cross-section of the inner surface of the transporting tube from its end to transportation channels in the sense of reduction gives rise to conditions favourable for the articles to be squeezed between the screw and the teeth projections;

absence of initial orientation;

the articles being enclosed in the tube during the entire transportion route hampers servicing of the apparatus, as there is no possibility of quick location of the jamming spot and establishing the cause of the apparatus failure.

Furthermore, said prior art apparatus makes it possible to extract and feed articles only of simple shapes, e.g. washers, caps, rings and the like, whose length (height)-to-diameter ratio does not exceed one (l/d<1). Long articles cannot be charged with the aid of said apparatus due to formation of a stable bridge before the inlet to the transporting tube.

An object of the present invention is to obviate said disadvantages of the foregoing apparatuses.

BRIEF DESCRIPTION OF THE INVENTION

The invention is based upon the task of providing an apparatus for extraction and feeding of piece articles from a bulk, designed in a manner which would allow rhythmic extraction of articles, irrespective of the shape thereof, and of frail thin-walled articles and articles with a high degree of surface finish, with a substantial improvement in the reliability of the apparatus operation.

This is accomplished by providing an apparatus for extraction and feeding of piece articles from a bulk, comprising a means for extraction of piece articles heaped up in a hopper, made in the form of a gripping screw and a transporting screw, arranged along whereof are members for holding the articles in the predetermined position during transportation, according to the invention, wherein a body of the gripping screw carries at least one spiral groove, a portion of which is a transporting surface forming pockets jointly with the holding members, and the hopper contains an orienting plate arranged at an angle to the gripping screw, forming inlets to said pockets and installed with a possibility of changing the configuration of said inlets.

It is advisable that cams for throwing off of wrongly oriented articles be arranged along the screw transporting surface.

Such a design of an apparatus for extraction and feeding of piece articles from a bulk makes it possible to use a wider variety of articles with due account of different length-to-diameter ratios, which may range from 0.2 to 10.

The essence of the present invention consists in the following. Use of at least one spiral groove provided on the body of the gripping screw, a portion of which is a transporting surface forming pockets jointly with the holding members, provides for separation and gripping by the pocket of one article at a time. The screw turns ensure gentle agitation of articles in the gripping zone, which precludes the formation of a bridge and ensures reliable operation for the apparatus. Articles at the hopper periphery are gradually displaced towards the gripping zone without appreciable collision, which retains the quality of surface finish. As there is no need for agitation of all articles in the hopper, the latter may be of any dimensions, depending on the production requirements, the volume, shape and dimensions of the hopper having no influence whatsoever on the operation of the gripping screw.

The orienting plate, forming inlets to said pockets and installed with a possibility of changing the configuration of said inlets, is arranged at an angle to the gripping screw, which provides an initial orientation of articles caught in the pocket. In this case, the article does not fall into the pocket in a passive manner, but is drawn into the inlet by the rotating members of the gripping screw, which promotes active filling of the pockets, thereby ensuring rhythmic feeding of articles. On the other hand, installation of the orienting plate with a possibility of changing the configuration of inlets allows setting of the requisite inlet width and pocket depth, depending on the dimensions of articles and their length-to-diameter ratio.

The apparatus of the invention allows a wide variety of articles to be rhythmically extracted and fed with high reliability and with the quality of the surface finish retained, which rules out manual labour and permits to automatization of the process of feeding the articles to production equipment at final operations.

BRIEF DESCRIPTION OF DRAWINGS

The invention will now be explained in greater detail in terms of a specific embodiment thereof taken in conjunction with the accompanying drawings, wherein:

FIG. 1 illustrates a general view of an apparatus for extraction and feeding of piece articles from a bulk;

FIG. 2 is a sectional view taken along line II—II in FIG. 1;

BEST MODE OF CARRYING OUT THE INVENTION

Figure 3A:
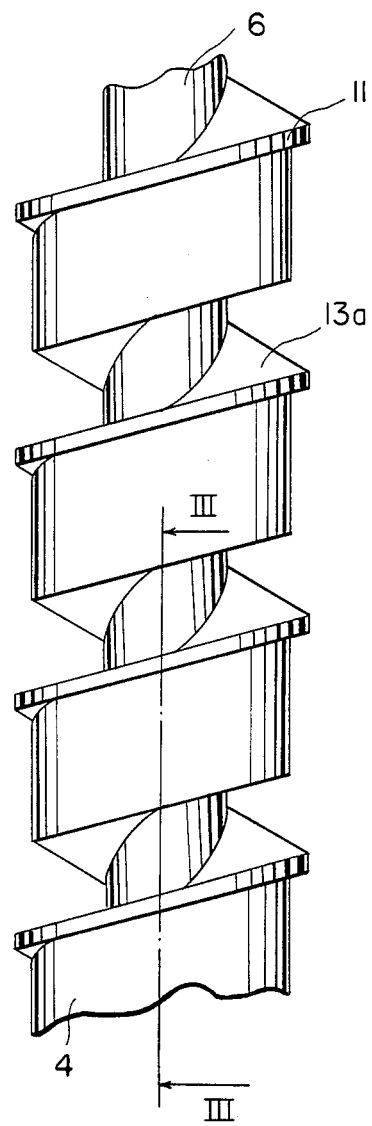
FIG. 3(a) is a enlarged view of a portion of the apparatus of the invention.
Figure 3B:
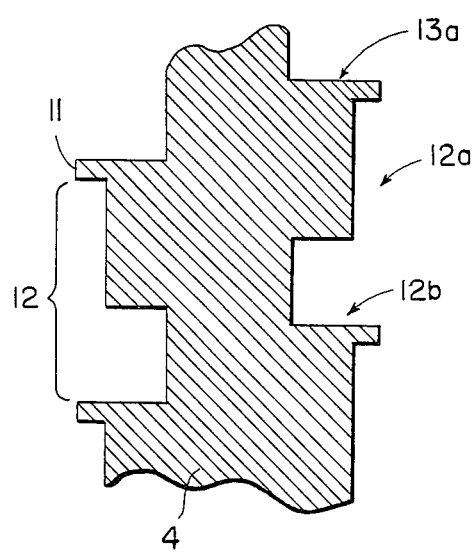
FIG. 3(b) is a sectional view taken along line III—III in FIG. 3(a)

The disclosed apparatus for extraction and feeding of piece articles from a bulk is designed for delivery to production equipment mainly of articles shaped as bodies of rotation, e.g. of a sleeve with a round-shaped bottom and the centre of gravity displaced towards the bottom.

Referring now to the drawings, in particular FIG. 1, the apparatus comprises a frame 1 with a hopper 2 and a drive 3 imparting rotation to a gripping screw 4 and a transporting screw 5 rigidly interconnected by means of a shaft 6.

To hold articles 7 in the preset position during transportation, the frame 1 carries members 8 and 9 made in the form of rectangular plates arranged along the screws.

A body of 10 of the gripping screw 4 having turns 11 carries a spiral groove 12b with a portion thereof being a transporting surface 13a, which adjoins a similar surface 13b, which is formed by a portion of a spiral groove 13 of the transporting screw 5. The width and the depth of the groove 12b, which depend on the diameter of the articles 7 handled by the given apparatus, are less than two diameters of the smallest article 7 irrespective of its length, which ensures separation from the bulk of only one article fitting in the groove 12.

Installed in the hopper 2 at an angle to the gripping screw 4 is an orienting plate 14, which makes the articles 7 change their initial position in the bulk during their entrance in pockets 15 (FIGS. 1 and 2) formed by the shaft 6, transporting surfaces 13a and 13b of the screws 4 and 5, and the holding members 8 and 9.

The plate 14 is fitted with a possibility of displacing relative to the gripping screw 4, thus varying the configuration of the inlets to the pockets 15 in conformity with the size of the articles 7 being transported.

Cams or eccentrics 16 to throw off the wrongly oriented articles 7, as shown in FIGS. 4(c), 4(d), 5(c) and 5(d), are installed on the frame 1 along the screws, the cams 16 being made with a curvilinear surface 17 and a possibility of displacing relative to the screws.

The apparatus of the invention operates as follows. The articles 7 are loaded into the hopper 2 (FIG. 1) in bulk, a part of the articles falling into the spiral groove 12b.

With the screws rotated clockwise by the drive 3, the articles 7, acted upon by the turns 11 of the gripping screw 4, are displaced towards the orienting plate 14 and drawn into the pockets 15 formed by the transporting surface 13a, the groove 12b, the holding members 8 and the orienting plate 14. Located in the gripping zone vertically or slopingly, the articles 7 are pushed off by the turns 11 of the gripping screw 4 upwards and away from the screw, which prevents the articles from forming a bridge and provides access to the pockets 15 for the horizontally arranged articles 7.

The width and depth of the groove 12b being a little less than two diameters of the articles being transported, only one article at a time enters the pocket. When in the pocket 15, the articles 7 assume one of the two positions, i.e. with either the bottom or the open part facing the holding members 8.

Figure 4A:
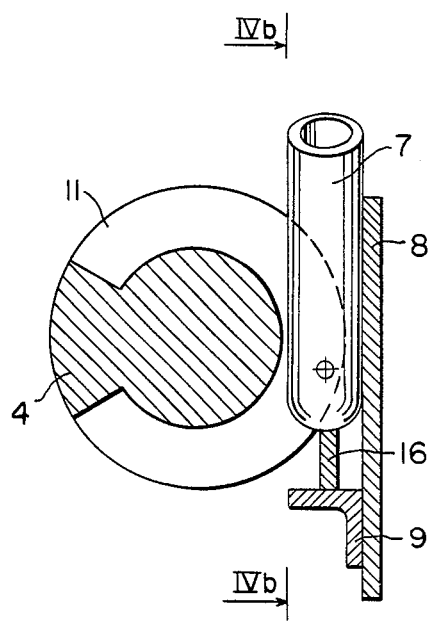
FIG. 4(a) shows a correctly oriented article during transportation thereof in the apparatus of the invention.
Figure 4B:
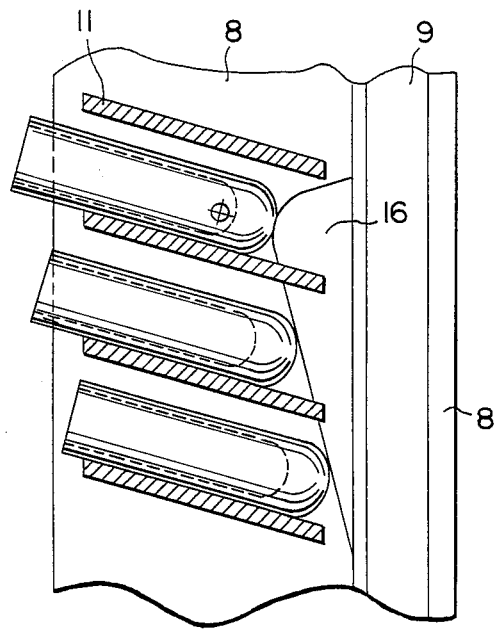
FIG. 4(b) is a side view taken along line IVb—IVb in FIG. 4(a)

Having reached the edge of the orienting plate 14, the articles with the bottom facing the holding members 8 turn in the direction of the screw rotation and contact the curvilinear surface 17 of the cam 16. Moving upwards, the article 7 is forced out of the screw by the cam 16, as shown in FIGS. 4(a) and 4(b), with the centre of gravity remaining in the zone of the transporting surface 13b. Having passed the curvilinear surface 17 of the cam 16, the article 7 remains in the pocket 15.

Following this, the article 7 contacts the holding member 9, to be transported by the surface 13b to the unloading site.

Figure 4C:
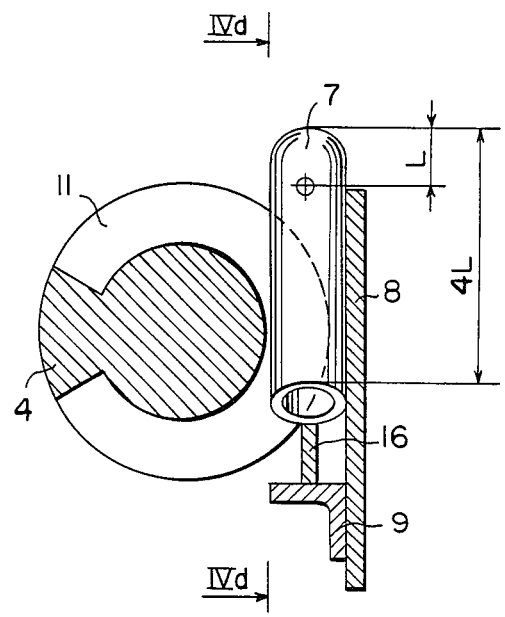
FIG. 4(c) shows an incorrectly oriented article during transportation thereof in the apparatus of the invention.
Figure 4D:
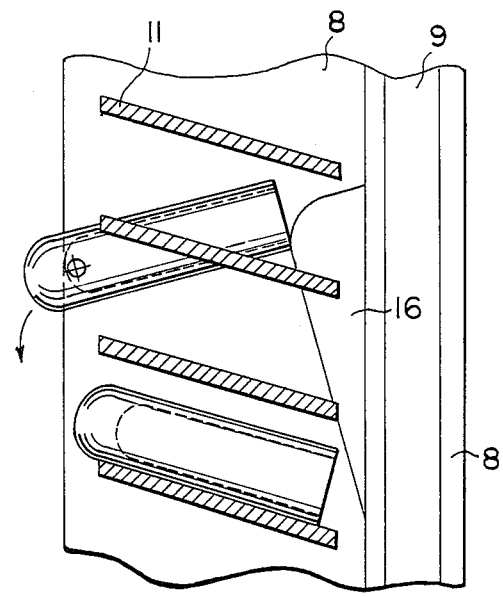
FIG. 4(d) is a side view taken along line IVd—IVd in FIG. 4(c)
Figure 5A:
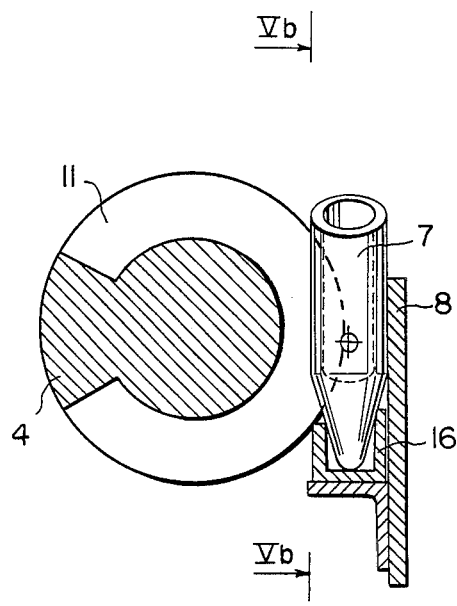
FIG. 5(a) shows a correctly oriented article during transportation thereof in the apparatus of the invention.
Figure 5C:
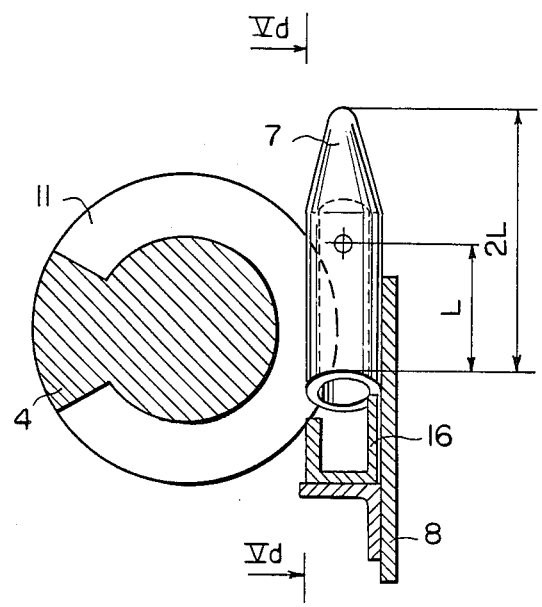
FIG. 5(c) shows an incorrectly oriented article during transportation thereof in the apparatus of the invention.
Figure 5B:
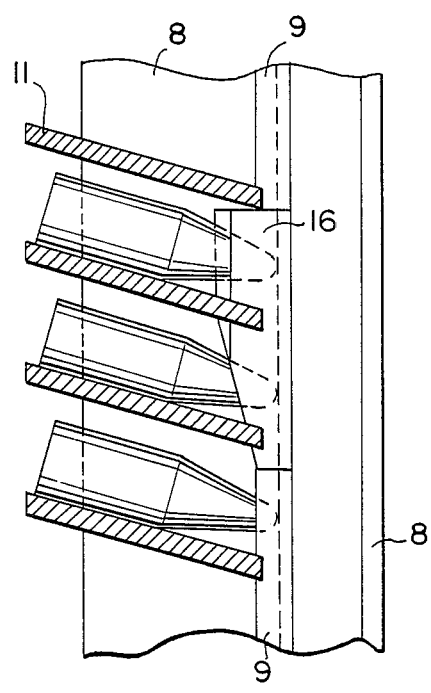
FIG. 5(b) is a side view taken along line Vb—Vb in FIG. 5(a)
Figure 5D:
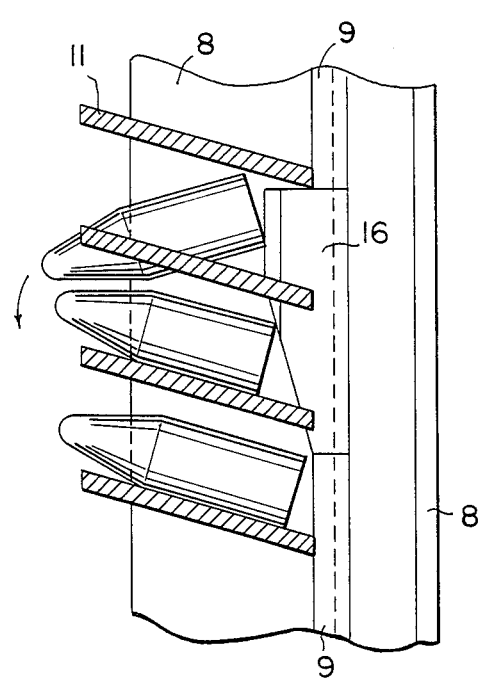
FIG. 5(d) is a side view taken along line Vd—Vd in FIG. 5(c).

The articles with the open part facing the holding members 8 contact the curvilinear surface 17 of the cam 16, to be subsequently forced out of the screw by a length whereat the article centre of gravity is displaced beyond the bounds of the surface 13, as shown in FIGS. 4(c) and 4(d) as a result of which the article falls from the pocket 15 back into the hopper 2.

Thus, the foregoing procedure ensures the delivery of similarly oriented (with the bottom facing the holding members 8 and 9) articles 7 to the unloading site.

Piece articles with intricately shaped surface having conical portions are extracted from a bulk and transported in a manner similar to that applicable to cylindrical articles. FIGS. 5(a–d) illustrate the interaction of cam 16 with correctly and incorrectly oriented piece articles having a conical portion.

The possibility of the articles being jammed and bridge being formed is obviated by the fact that the articles are moved by the gripping screw 4 along the orienting plate 14 to a more vacant space.

To heighten the capacity of the apparatus, the body 10 of the gripping screw 4 is provided not with one but with several spiral grooves 12a, 12b and the transporting screw 5 is made with multiple thread corresponding to the number of grooves (omitted in the drawing).

INDUSTRIAL APPLICABILITY

The disclosed apparatus permits delivery of articles, including long ones, due to the gripping screw acting not only upon horizontally but also upon vertically located articles. The provision of a spiral groove on the body of the gripping screw ensures piece-by-piece extraction of a wide variety of articles from a bulk.

We claim:

1. An apparatus for extraction and feeding of piece articles from a bulk to a delivery site, said apparatus comprising:
   a hopper for retaining a plurality of randomly oriented piece articles;
   a vertically disposed gripping screw at least partially received within said hopper, said gripping screw comprising at least one spiral gripping screw channel and having a gripping screw transporting surface formed by a portion of said spiral gripping screw channel;
   a vertically disposed transporting screw having a lower end adjacent an upper end of said gripping screw and interconnected with said gripping screw by a shaft such that said gripping screw and said transporting screw have a common axis of rotation, said transporting screw comprising a spiral transporting screw channel and having a transporting screw transporting surface formed by a portion of said spiral transporting screw channel, said transporting screw transporting surface being connected to said gripping screw transporting surface such that a continuous transporting surface is formed which extends along said gripping screw and said transporting screw;
   a plurality of holding members provided along said gripping screw and said transporting screw for holding said piece articles during transportation thereof, said holding members and said spiral gripping screw channel forming pockets along said gripping screw;
   an orienting plate provided within said hopper adjacent a lower portion of said gripping screw, said orienting plate being positioned to control entry of said piece articles into said pockets; and
   drive means for rotating said gripping screw and said transporting screw;
   wherein, upon rotation of said gripping screw and said transporting screw by said drive means, piece articles are fed from said hopper to said pockets and transported along said gripping screw and said transporting screw on said continuous transporting surface to a delivery site above said hopper, said delivery site being located adjacent said transporting screw; and wherein piece articles delivered to said delivery site have a predetermined orientation.

2. An apparatus as set forth in claim 1, wherein said gripping screw comprises two adjacent spiral gripping screw channels.

3. An apparatus as set forth in claim 1, further comprising at least one eccentric member carried by said holding members, said eccentric member comprising a plate having a curved surface directed toward said gripping screw and said transporting screw, wherein said eccentric member displaces piece articles having an orientation other than said predetermined orientation from said continuous transporting surface, said eccentric member thereby preventing transportation of incorrectly oriented piece articles to said delivery site.

* * * * *